(12) United States Patent
Goodman et al.

(10) Patent No.: US 10,839,509 B2
(45) Date of Patent: Nov. 17, 2020

(54) SPATIAL MULTIPLEXING OF HISTOLOGICAL STAINS

(71) Applicant: 3Scan Inc., San Francisco, CA (US)

(72) Inventors: Matthew Goodman, San Francisco, CA (US); Todd Huffman, San Francisco, CA (US); Cody Daniel, San Francisco, CA (US)

(73) Assignee: 3Scan Inc., San Francisco, CA (US)

( * ) Notice: Subject to any disclaimer, the term of this patent is extended or adjusted under 35 U.S.C. 154(b) by 0 days.

(21) Appl. No.: 15/205,288

(22) Filed: Jul. 8, 2016

(65) Prior Publication Data

US 2017/0011511 A1    Jan. 12, 2017

Related U.S. Application Data

(60) Provisional application No. 62/190,931, filed on Jul. 10, 2015.

(51) Int. Cl.
| | | |
|---|---|---|
| G06T 7/00 | (2017.01) | |
| G01N 1/06 | (2006.01) | |
| G06K 9/00 | (2006.01) | |
| G06T 7/33 | (2017.01) | |
| G06K 9/32 | (2006.01) | |
| G01N 1/30 | (2006.01) | |

(52) U.S. Cl.
CPC ............ G06T 7/0012 (2013.01); G01N 1/06 (2013.01); G06K 9/0014 (2013.01); G06K 9/00134 (2013.01); G06K 9/32 (2013.01); G06T 7/33 (2017.01); G01N 1/30 (2013.01);
(Continued)

(58) Field of Classification Search
None
See application file for complete search history.

(56) References Cited

U.S. PATENT DOCUMENTS

| | | |
|---|---|---|
| 4,021,118 A | 5/1977 | Soderkvist et al. |
| 4,532,838 A | 8/1985 | Soederkvist |
| 4,581,969 A | 4/1986 | Kim |

(Continued)

FOREIGN PATENT DOCUMENTS

| | | |
|---|---|---|
| CN | 101044388 A | 9/2007 |
| CN | 101477241 A | 7/2009 |

(Continued)

OTHER PUBLICATIONS

European Search Report dated May 30, 2017 for EP Application No. 14857971.7.
(Continued)

*Primary Examiner* — Nancy Bitar
(74) *Attorney, Agent, or Firm* — Wong & Rees LLP; Kirk D. Wong

(57) ABSTRACT

The following concerns a method for co-localization of microscopy or histology stains by the assembly of a virtual image from one or more imaging operations. In particular, the method decreases the time required to obtain multiple labeled antigen or protein histology images of a biological sample. The method includes imaging the tissue as it is sliced by a microtome with a knife edge scanning microscope and spatially aligning the samples by the generated images. The spatial alignment of samples enabled by the method allows a panel of different antigen or protein secondary or functional stains to be compared across different sample slices, thereby allowing concurrent secondary stains of tissues and cells.

18 Claims, 8 Drawing Sheets

(52) U.S. Cl.
CPC ............... *G06T 2207/10056* (2013.01); *G06T 2207/30024* (2013.01)

(56) References Cited

U.S. PATENT DOCUMENTS

| | | | |
|---|---|---|---|
| 4,697,489 A | 10/1987 | Kim | |
| 5,181,443 A | 1/1993 | Sitte et al. | |
| 5,226,335 A * | 7/1993 | Sitte | G01N 1/06 83/703 |
| 5,282,404 A | 2/1994 | Leighton et al. | |
| 5,461,953 A | 10/1995 | McCormick | |
| 5,752,425 A | 5/1998 | Asakura et al. | |
| 5,978,833 A | 11/1999 | Pashley et al. | |
| 5,985,563 A | 11/1999 | Hyldig-Nielsen et al. | |
| 6,026,465 A | 2/2000 | Mills et al. | |
| 6,029,530 A | 2/2000 | Patton et al. | |
| 6,110,676 A | 8/2000 | Coull et al. | |
| 6,112,332 A | 9/2000 | McCormick | |
| 6,142,019 A | 11/2000 | Venchiarutti et al. | |
| 6,169,169 B1 | 1/2001 | Hyldig-Nielsen et al. | |
| 6,176,135 B1 | 1/2001 | Dubois et al. | |
| 6,196,221 B1 | 3/2001 | McCormick | |
| 6,235,476 B1 | 5/2001 | Bergmann et al. | |
| 6,287,772 B1 | 9/2001 | Stefano et al. | |
| 6,310,179 B1 | 10/2001 | Batz et al. | |
| 6,325,858 B1 | 12/2001 | Wengert et al. | |
| 6,335,943 B1 | 1/2002 | Lorraine et al. | |
| 6,385,688 B1 | 5/2002 | Mills et al. | |
| 6,388,061 B1 | 5/2002 | Bergmann et al. | |
| 6,458,598 B1 | 10/2002 | Huang | |
| 6,564,285 B1 | 5/2003 | Mills et al. | |
| 6,649,900 B2 | 11/2003 | Filkins et al. | |
| 6,668,654 B2 | 12/2003 | Dubois et al. | |
| 6,681,073 B2 | 1/2004 | Chan et al. | |
| 6,684,701 B2 | 2/2004 | Dubois et al. | |
| 6,710,912 B1 | 3/2004 | Filkins et al. | |
| 6,711,312 B1 | 3/2004 | Kornrumpf et al. | |
| 6,716,574 B2 | 4/2004 | Mathiesen et al. | |
| 6,727,072 B2 | 4/2004 | Spaulding et al. | |
| 6,732,587 B2 | 5/2004 | Lorraine et al. | |
| 6,744,572 B1 | 6/2004 | McCormick | |
| 6,744,575 B1 * | 6/2004 | Andrews | G02B 7/02 359/819 |
| 6,753,421 B2 | 6/2004 | Stender et al. | |
| 6,813,838 B2 | 11/2004 | McCormick | |
| 6,818,466 B2 | 11/2004 | Kornrumpf et al. | |
| 6,856,918 B2 | 2/2005 | Dubois et al. | |
| 6,927,686 B2 | 8/2005 | Nieters et al. | |
| 6,930,292 B1 | 8/2005 | Winther et al. | |
| 7,012,689 B2 | 3/2006 | Sharpe | |
| 7,016,470 B2 | 3/2006 | Lawrence et al. | |
| 7,039,362 B2 | 5/2006 | Filkins et al. | |
| 7,078,687 B2 | 7/2006 | Uenishi et al. | |
| 7,105,294 B2 | 9/2006 | Van Dongen et al. | |
| 7,110,192 B2 | 9/2006 | Sauter et al. | |
| 7,117,134 B2 | 10/2006 | Dubois et al. | |
| 7,123,393 B2 | 10/2006 | Dubois et al. | |
| 7,135,563 B2 | 11/2006 | Stefano et al. | |
| 7,306,916 B2 | 12/2007 | Poulsen et al. | |
| 7,310,408 B2 | 12/2007 | Filkins et al. | |
| 7,327,022 B2 | 2/2008 | Claydon et al. | |
| 7,327,515 B2 | 2/2008 | Virag et al. | |
| 7,367,945 B2 | 5/2008 | Dasgupta et al. | |
| 7,368,245 B2 | 5/2008 | Van Dongen et al. | |
| 7,374,907 B1 | 5/2008 | Voneiff et al. | |
| 7,400,983 B2 | 7/2008 | Feingold et al. | |
| 7,410,684 B2 | 8/2008 | McCormick | |
| 7,411,991 B2 | 8/2008 | Lawrence et al. | |
| 7,480,574 B2 | 1/2009 | Dubois et al. | |
| D591,864 S | 5/2009 | Schmidt | |
| 7,544,953 B2 | 6/2009 | Goodman | |
| 7,545,964 B2 | 6/2009 | Lang et al. | |
| 7,553,672 B2 | 6/2009 | Bogen et al. | |
| 7,558,417 B2 | 7/2009 | Knoplioch et al. | |
| 7,569,675 B2 | 8/2009 | Xia et al. | |
| 7,571,728 B2 | 8/2009 | Forman et al. | |
| 7,576,307 B2 | 8/2009 | Yazdanfar et al. | |
| 7,584,019 B2 | 9/2009 | Feingold et al. | |
| 7,593,787 B2 | 9/2009 | Feingold et al. | |
| 7,599,542 B2 | 10/2009 | Brockway et al. | |
| 7,603,201 B2 | 10/2009 | Feingold et al. | |
| 7,613,571 B2 | 11/2009 | Doyle et al. | |
| 7,615,009 B2 | 11/2009 | Koste et al. | |
| 7,629,125 B2 | 12/2009 | Sood et al. | |
| 7,630,550 B2 | 12/2009 | Maroy et al. | |
| 7,640,050 B2 | 12/2009 | Glenn, Jr. et al. | |
| 7,642,050 B2 | 1/2010 | Nevalainen et al. | |
| 7,642,057 B2 | 1/2010 | Van Dongen et al. | |
| 7,646,902 B2 | 1/2010 | Chan et al. | |
| 7,648,579 B2 | 1/2010 | Goodman et al. | |
| 7,648,678 B2 | 1/2010 | Favuzzi et al. | |
| 7,653,229 B2 | 1/2010 | Kaufhold et al. | |
| 7,657,299 B2 | 2/2010 | Huizenga et al. | |
| 7,663,078 B2 | 2/2010 | Virag et al. | |
| 7,667,851 B2 | 2/2010 | Dubois et al. | |
| 7,674,589 B2 | 3/2010 | Cohen et al. | |
| 7,699,790 B2 | 4/2010 | Simpson | |
| 7,700,075 B2 | 4/2010 | Weichert et al. | |
| 7,718,435 B1 | 5/2010 | Bogen et al. | |
| 7,722,540 B2 | 5/2010 | Abe et al. | |
| 7,741,045 B2 | 6/2010 | Gerdes et al. | |
| 7,754,147 B2 | 7/2010 | Ljungmann et al. | |
| 7,758,809 B2 | 7/2010 | Favuzzi et al. | |
| 7,776,274 B2 | 8/2010 | Williamson et al. | |
| 7,778,493 B2 | 8/2010 | Ho et al. | |
| 7,781,174 B2 | 8/2010 | Almouzni et al. | |
| 7,805,183 B2 | 9/2010 | Keely et al. | |
| 7,807,150 B2 | 10/2010 | Griffith et al. | |
| 7,809,178 B2 | 10/2010 | Spies et al. | |
| 7,820,400 B2 | 10/2010 | Trakht et al. | |
| 7,821,646 B2 | 10/2010 | Drake, Jr. et al. | |
| 7,831,075 B2 | 11/2010 | Wilson et al. | |
| 7,835,784 B2 | 11/2010 | Mire et al. | |
| 7,844,125 B2 | 11/2010 | Eichhorn et al. | |
| 7,850,912 B2 | 12/2010 | Fauzzi et al. | |
| 7,853,089 B2 | 12/2010 | Shafirstein et al. | |
| 7,853,310 B2 | 12/2010 | Vining et al. | |
| 7,867,442 B2 | 1/2011 | Graupner et al. | |
| 7,867,443 B2 | 1/2011 | Key et al. | |
| 7,873,223 B2 | 1/2011 | Binnig et al. | |
| 7,873,478 B2 | 1/2011 | Suckau et al. | |
| 7,875,245 B2 | 1/2011 | Favuzzi et al. | |
| 7,893,934 B2 | 2/2011 | Gan | |
| 7,894,997 B2 | 2/2011 | Doyle et al. | |
| 7,899,624 B2 | 3/2011 | Cualing et al. | |
| 7,901,634 B2 | 3/2011 | Testa et al. | |
| 7,901,874 B2 | 3/2011 | Doi et al. | |
| 7,902,822 B2 | 3/2011 | Fontius et al. | |
| 7,906,301 B2 | 3/2011 | Krizman et al. | |
| 7,919,254 B2 | 4/2011 | Cohen et al. | |
| 7,919,756 B2 | 4/2011 | Beekman | |
| 7,929,661 B2 | 4/2011 | Borghese et al. | |
| 7,937,228 B2 | 5/2011 | Feingold et al. | |
| 7,943,225 B2 | 5/2011 | McCormick | |
| 7,951,394 B2 | 5/2011 | Brekke et al. | |
| 7,952,798 B2 | 5/2011 | Ljungmann et al. | |
| 7,960,178 B2 | 6/2011 | Key et al. | |
| 7,972,789 B2 | 7/2011 | Petersen | |
| 7,975,586 B2 | 7/2011 | McCormick | |
| 7,988,643 B2 | 8/2011 | Hoffmann et al. | |
| 7,989,207 B2 | 8/2011 | Soito et al. | |
| 7,989,208 B2 | 8/2011 | Denton et al. | |
| 7,995,809 B2 | 8/2011 | Okada et al. | |
| 7,998,408 B2 | 8/2011 | Ljungmann et al. | |
| 8,012,707 B2 | 9/2011 | Zavada et al. | |
| 8,041,147 B2 | 10/2011 | Molnar et al. | |
| 8,043,614 B2 | 10/2011 | Ahlfors | |
| 8,047,990 B2 | 11/2011 | Burdette et al. | |
| 8,048,206 B2 | 11/2011 | Schmitt et al. | |
| 8,054,470 B2 | 11/2011 | Lorraine et al. | |
| 8,060,348 B2 | 11/2011 | Cline et al. | |
| 8,063,385 B2 | 11/2011 | Filkins et al. | |
| 8,064,488 B2 | 11/2011 | Drake, Jr. et al. | |
| 8,064,663 B2 | 11/2011 | Van Hoe et al. | |

(56) References Cited

U.S. PATENT DOCUMENTS

| | | |
|---|---|---|
| 8,068,894 B2 | 11/2011 | Huizenga et al. |
| 8,073,290 B2 | 12/2011 | Vomweg et al. |
| 8,077,386 B2 | 12/2011 | Glaser et al. |
| 8,077,945 B2 | 12/2011 | Kawato et al. |
| 8,088,225 B2 | 1/2012 | Goodman et al. |
| 8,090,540 B2 | 1/2012 | Leo et al. |
| 8,093,012 B2 | 1/2012 | Hamann et al. |
| 8,094,912 B2 | 1/2012 | Miyamoto et al. |
| 8,107,702 B2 | 1/2012 | Agliozzo |
| 8,111,896 B2 | 2/2012 | Agliozzo et al. |
| 8,113,056 B2 | 2/2012 | Drake, Jr. et al. |
| 8,115,760 B2 | 2/2012 | Rust |
| 8,135,452 B2 | 3/2012 | Dougherty et al. |
| 8,150,192 B2 | 4/2012 | Niemeyer et al. |
| 8,152,906 B2 | 4/2012 | Schmitt et al. |
| 8,158,128 B2 | 4/2012 | Grimes |
| 8,160,317 B2 | 4/2012 | Amunts et al. |
| 8,166,855 B2 | 5/2012 | Ito et al. |
| 8,172,927 B2 | 5/2012 | Schmitt et al. |
| 8,173,068 B2 | 5/2012 | Loeffler et al. |
| 8,179,432 B2 | 5/2012 | Yazdanfar et al. |
| 8,187,536 B2 | 5/2012 | Graupner et al. |
| 8,199,997 B2 | 6/2012 | Rutenberg et al. |
| 8,203,575 B2 | 6/2012 | Molnar et al. |
| 8,211,385 B2 | 7/2012 | Testa et al. |
| 8,216,512 B2 | 7/2012 | Winther et al. |
| 8,216,846 B2 | 7/2012 | Ljungmann et al. |
| 8,221,480 B2 | 7/2012 | Boyden et al. |
| 8,221,970 B2 | 7/2012 | Chau et al. |
| 8,223,915 B2 | 7/2012 | Borghese et al. |
| 8,229,186 B2 | 7/2012 | Milstein et al. |
| 8,238,632 B2 | 8/2012 | Wilson et al. |
| 8,249,813 B2 | 8/2012 | Raghavan et al. |
| 8,253,778 B2 | 8/2012 | Takahashi et al. |
| 8,257,968 B2 | 9/2012 | Sweet et al. |
| 8,268,964 B2 | 9/2012 | Schoeller et al. |
| 8,270,071 B2 | 9/2012 | Glaser et al. |
| 8,275,182 B2 | 9/2012 | Badiei et al. |
| 8,275,446 B2 | 9/2012 | Vining et al. |
| 8,283,176 B2 | 10/2012 | Bland et al. |
| 8,287,938 B1 | 10/2012 | Scheer |
| 8,288,122 B2 | 10/2012 | O'Leary et al. |
| 8,298,815 B2 | 10/2012 | Buchanan et al. |
| 8,309,038 B2 | 11/2012 | Walter et al. |
| 8,314,084 B2 | 11/2012 | Brekke et al. |
| 8,318,095 B2 | 11/2012 | Ljungmann et al. |
| 8,329,120 B2 | 12/2012 | Williamson, IV et al. |
| 8,329,427 B2 | 12/2012 | Heid et al. |
| 8,337,382 B2 | 12/2012 | Schneider et al. |
| 8,343,052 B2 | 1/2013 | Kawagishi et al. |
| 8,343,527 B2 | 1/2013 | Dadsetan et al. |
| 8,345,940 B2 | 1/2013 | Mattiuzzi et al. |
| 8,346,574 B2 | 1/2013 | Chirica et al. |
| 8,352,060 B2 | 1/2013 | Chun et al. |
| 8,367,351 B2 | 2/2013 | Gustavson et al. |
| 8,367,363 B2 | 2/2013 | Addington et al. |
| 8,383,067 B2 | 2/2013 | Williamson et al. |
| 8,386,015 B2 | 2/2013 | Kamen et al. |
| 8,386,195 B2 | 2/2013 | Feingold et al. |
| 8,394,635 B2 | 3/2013 | Key et al. |
| 8,396,269 B2 | 3/2013 | Henderson et al. |
| 8,409,506 B2 | 4/2013 | Ljungmann et al. |
| 8,409,793 B2 | 4/2013 | Perrut et al. |
| 8,420,884 B2 | 4/2013 | Charest |
| 8,425,418 B2 | 4/2013 | Suri et al. |
| 8,435,735 B2 | 5/2013 | Lohse |
| 8,443,960 B2 | 5/2013 | Virag et al. |
| 8,457,710 B2 | 6/2013 | Biglieri et al. |
| 8,463,741 B2 | 6/2013 | Ehlke et al. |
| 8,465,944 B2 | 6/2013 | Christensen et al. |
| 8,481,283 B2 | 7/2013 | O'Leary et al. |
| 8,481,697 B2 | 7/2013 | Lohse et al. |
| 8,486,714 B2 | 7/2013 | Favuzzi et al. |
| 8,497,080 B2 | 7/2013 | Gustavson et al. |
| 8,498,049 B2 | 7/2013 | Ljungmann et al. |
| 8,503,744 B2 | 8/2013 | Shlomi |
| 8,508,589 B2 | 8/2013 | Harding et al. |
| 8,513,398 B2 | 8/2013 | Chau et al. |
| 8,515,200 B2 | 8/2013 | Mikheev et al. |
| 8,515,201 B1 | 8/2013 | Murray et al. |
| 8,517,955 B2 | 8/2013 | Keast et al. |
| 8,529,836 B2 | 9/2013 | Winther et al. |
| 8,532,398 B2 | 9/2013 | Filkins et al. |
| 8,541,227 B2 | 9/2013 | Christensen et al. |
| 8,546,309 B2 | 10/2013 | Lohse |
| 8,565,507 B2 | 10/2013 | Salafia et al. |
| 8,582,858 B2 | 11/2013 | Su et al. |
| 8,598,543 B2 | 12/2013 | Balakin |
| 8,599,388 B1 | 12/2013 | Van Dijk et al. |
| 8,600,129 B2 | 12/2013 | Seko et al. |
| 8,603,763 B2 | 12/2013 | Chen-Kiang et al. |
| 8,609,354 B2 | 12/2013 | Carpen et al. |
| 8,620,045 B2 | 12/2013 | Adams et al. |
| 8,623,300 B2 | 1/2014 | Williamson |
| 8,623,666 B2 | 1/2014 | Jarsch et al. |
| 8,632,994 B2 | 1/2014 | Winther et al. |
| 8,634,629 B2 | 1/2014 | Wilson |
| 8,638,295 B2 | 1/2014 | Bruss et al. |
| 8,639,484 B2 | 1/2014 | Sun et al. |
| 8,649,581 B2 | 2/2014 | Van Herpen et al. |
| 8,652,067 B2 | 2/2014 | Lonky et al. |
| 8,652,408 B2 | 2/2014 | Ljungmann et al. |
| 8,658,389 B2 | 2/2014 | Bieniarz et al. |
| 8,663,929 B2 | 3/2014 | Kataoka et al. |
| 8,663,978 B2 | 3/2014 | Sweet et al. |
| 8,673,642 B2 | 3/2014 | Key et al. |
| 8,673,643 B2 | 3/2014 | Corwin et al. |
| 8,676,509 B2 | 3/2014 | Torre-Bueno et al. |
| 8,679,746 B2 | 3/2014 | Nielsen et al. |
| RE44,877 E | 4/2014 | Pashley et al. |
| 8,685,399 B2 | 4/2014 | Hoff et al. |
| 8,690,945 B2 | 4/2014 | Fitz et al. |
| 8,691,583 B2 | 4/2014 | Ljungmann et al. |
| 8,691,974 B2 | 4/2014 | Gatenholm et al. |
| 8,699,769 B2 | 4/2014 | Schoenmeyer et al. |
| 8,709,359 B2 | 4/2014 | Laugharn, Jr. |
| 8,711,149 B2 | 4/2014 | Schmidt et al. |
| 9,177,378 B2 * | 11/2015 | Schoenmeyer ....... G06T 7/0012 |
| 2002/0066318 A1 | 6/2002 | Dubois et al. |
| 2002/0131757 A1 | 9/2002 | Chan et al. |
| 2003/0020923 A1 | 1/2003 | Dubois et al. |
| 2003/0033882 A1 | 2/2003 | Dubois et al. |
| 2003/0047667 A1 | 3/2003 | Filkins et al. |
| 2003/0060163 A1 | 3/2003 | Filkins et al. |
| 2003/0077635 A1 | 4/2003 | Lohse |
| 2003/0078681 A1 | 4/2003 | Dubois et al. |
| 2003/0101007 A1 | 5/2003 | Dubois et al. |
| 2003/0145655 A1 | 8/2003 | Lorraine et al. |
| 2003/0171839 A1 | 9/2003 | McCormick |
| 2004/0043383 A1 | 3/2004 | Van Dongen et al. |
| 2004/0063110 A1 | 4/2004 | Stender et al. |
| 2004/0113773 A1 | 6/2004 | Nieters et al. |
| 2004/0120626 A1 | 6/2004 | Kornrumpf et al. |
| 2004/0126050 A1 | 7/2004 | Claydon et al. |
| 2004/0265934 A1 | 12/2004 | Stender et al. |
| 2005/0018748 A1 | 1/2005 | Ringermacher et al. |
| 2005/0044732 A1 | 3/2005 | McCormick |
| 2005/0062897 A1 * | 3/2005 | Lei ......................... H04N 5/20 348/806 |
| 2005/0064535 A1 | 3/2005 | Favuzzi et al. |
| 2005/0098445 A1 | 5/2005 | Batzinger et al. |
| 2005/0102109 A1 | 5/2005 | Dubois et al. |
| 2005/0136333 A1 | 6/2005 | Lawrence et al. |
| 2005/0193952 A1 | 9/2005 | Goodman et al. |
| 2005/0213708 A1 | 9/2005 | Lawrence et al. |
| 2005/0213710 A1 | 9/2005 | Lawrence et al. |
| 2005/0215894 A1 | 9/2005 | Dasgupta et al. |
| 2005/0226282 A1 | 10/2005 | Lawrence et al. |
| 2005/0281988 A1 | 12/2005 | McCormick |
| 2006/0046298 A1 | 3/2006 | Key et al. |
| 2006/0066930 A1 | 3/2006 | Dubois et al. |
| 2006/0134793 A1 | 6/2006 | Key et al. |
| 2006/0144351 A1 | 7/2006 | Falb et al. |
| 2006/0160106 A1 | 7/2006 | Van Dongen et al. |

(56) References Cited

U.S. PATENT DOCUMENTS

| | | |
|---|---|---|
| 2006/0222147 A1 | 10/2006 | Filkins et al. |
| 2006/0254088 A1 | 11/2006 | McCormick |
| 2006/0259253 A1 | 11/2006 | Ellison et al. |
| 2007/0015992 A1 | 1/2007 | Filkins et al. |
| 2007/0025917 A1 | 2/2007 | Tian et al. |
| 2007/0141711 A1 | 6/2007 | Stephens et al. |
| 2007/0167816 A1 | 7/2007 | Koste et al. |
| 2007/0175751 A1 | 8/2007 | Batzinger et al. |
| 2007/0224390 A1 | 9/2007 | McCormick |
| 2008/0032321 A1 | 2/2008 | Ginty et al. |
| 2008/0033657 A1 | 2/2008 | Cline et al. |
| 2008/0118916 A1 | 5/2008 | Sood et al. |
| 2008/0118934 A1 | 5/2008 | Gerdes et al. |
| 2008/0123913 A1 | 5/2008 | Virag et al. |
| 2008/0144167 A1 | 6/2008 | Meyers et al. |
| 2008/0187934 A1 | 8/2008 | Van Dongen et al. |
| 2008/0241876 A1 | 10/2008 | Feingold et al. |
| 2008/0266440 A1 | 10/2008 | Yazdanfar et al. |
| 2008/0266652 A1 | 10/2008 | Yazdanfar et al. |
| 2008/0318240 A1 | 12/2008 | Nielsen et al. |
| 2009/0022419 A1 | 1/2009 | Molnar et al. |
| 2009/0046192 A1 | 2/2009 | Molnar et al. |
| 2009/0052498 A1 | 2/2009 | Halpin et al. |
| 2009/0114825 A1 | 5/2009 | Beekman |
| 2009/0114849 A1 | 5/2009 | Schneider et al. |
| 2009/0118171 A1 | 5/2009 | Zollo |
| 2009/0128145 A1 | 5/2009 | Shepherd et al. |
| 2009/0136108 A1 | 5/2009 | Badiei et al. |
| 2009/0136971 A1 | 5/2009 | Krizman et al. |
| 2009/0143669 A1 | 6/2009 | Harms et al. |
| 2009/0155803 A1 | 6/2009 | Cohen et al. |
| 2009/0156428 A1 | 6/2009 | Malcolm |
| 2009/0169118 A1 | 7/2009 | Eichhorn et al. |
| 2009/0169575 A1 | 7/2009 | Rohlff |
| 2009/0175527 A1 | 7/2009 | Agliozzo et al. |
| 2009/0176253 A1 | 7/2009 | Bieniarz et al. |
| 2009/0181398 A1 | 7/2009 | Bauer et al. |
| 2009/0181422 A1 | 7/2009 | Schmitt et al. |
| 2009/0181457 A1 | 7/2009 | Schmitt |
| 2009/0192047 A1 | 7/2009 | Parr et al. |
| 2009/0199716 A1 | 8/2009 | Schmitt et al. |
| 2009/0203543 A1 | 8/2009 | Boender |
| 2009/0208481 A1 | 8/2009 | Steinman et al. |
| 2009/0226905 A1 | 9/2009 | Joubert et al. |
| 2009/0252393 A1 | 10/2009 | Agliozzo |
| 2009/0253163 A1 | 10/2009 | Xie et al. |
| 2009/0281418 A1 | 11/2009 | Ruijters et al. |
| 2009/0282919 A1 | 11/2009 | Drake, Jr. et al. |
| 2009/0284751 A1 | 11/2009 | Drake, Jr. et al. |
| 2009/0284752 A1 | 11/2009 | Lorraine et al. |
| 2009/0285244 A1 | 11/2009 | Drake, Jr. et al. |
| 2009/0292198 A1 | 11/2009 | Kleiven et al. |
| 2009/0292206 A1 | 11/2009 | Sato |
| 2009/0298042 A1 | 12/2009 | Noll et al. |
| 2009/0310741 A1 | 12/2009 | Borghese et al. |
| 2009/0325223 A1 | 12/2009 | Boyd |
| 2010/0003692 A1 | 1/2010 | Denton et al. |
| 2010/0016765 A1 | 1/2010 | Hall et al. |
| 2010/0017030 A1 | 1/2010 | Feingold et al. |
| 2010/0030298 A1 | 2/2010 | Martens et al. |
| 2010/0030364 A1 | 2/2010 | Fujimoto et al. |
| 2010/0034791 A1 | 2/2010 | Lelkes et al. |
| 2010/0036245 A1 | 2/2010 | Yu et al. |
| 2010/0043612 A1 | 2/2010 | Ichiyanagi et al. |
| 2010/0047925 A1 | 2/2010 | Sood et al. |
| 2010/0049448 A1 | 2/2010 | Doyle et al. |
| 2010/0056390 A1 | 3/2010 | Fischbach |
| 2010/0062452 A1 | 3/2010 | Gustavson et al. |
| 2010/0074487 A1 | 3/2010 | Miyamoto et al. |
| 2010/0081167 A1 | 4/2010 | Favuzzi et al. |
| 2010/0081190 A1 | 4/2010 | Hyde et al. |
| 2010/0081915 A1 | 4/2010 | Hyde et al. |
| 2010/0081916 A1 | 4/2010 | Hyde et al. |
| 2010/0081919 A1 | 4/2010 | Hyde et al. |
| 2010/0081924 A1 | 4/2010 | Hyde et al. |
| 2010/0089314 A1 | 4/2010 | Goodman et al. |
| 2010/0097692 A1 | 4/2010 | Glaser et al. |
| 2010/0105030 A1 | 4/2010 | Lohse et al. |
| 2010/0105145 A1 | 4/2010 | Winther |
| 2010/0120053 A1 | 5/2010 | Cohen et al. |
| 2010/0121172 A1 | 5/2010 | Ladic et al. |
| 2010/0135544 A1 | 6/2010 | Mattiuzzi et al. |
| 2010/0136613 A1 | 6/2010 | O'Leary et al. |
| 2010/0142794 A1 | 6/2010 | Gardi et al. |
| 2010/0143436 A1 | 6/2010 | Bondos et al. |
| 2010/0162416 A1 | 6/2010 | Krtolica et al. |
| 2010/0166747 A1 | 7/2010 | Beltran et al. |
| 2010/0168390 A1 | 7/2010 | Brix et al. |
| 2010/0172837 A1 | 7/2010 | Zavada et al. |
| 2010/0184127 A1 | 7/2010 | Williamson, IV et al. |
| 2010/0185079 A1 | 7/2010 | Huizenga et al. |
| 2010/0189319 A1 | 7/2010 | Wu et al. |
| 2010/0196509 A1 | 8/2010 | Braun et al. |
| 2010/0203553 A1 | 8/2010 | Abdeen et al. |
| 2010/0210968 A1 | 8/2010 | Lonky et al. |
| 2010/0216221 A1 | 8/2010 | Walter et al. |
| 2010/0220916 A1 | 9/2010 | Salafia et al. |
| 2010/0226854 A1 | 9/2010 | Schoeller et al. |
| 2010/0231703 A1 | 9/2010 | Varga et al. |
| 2010/0233132 A1 | 9/2010 | Ferreira et al. |
| 2010/0246907 A1 | 9/2010 | Wachman et al. |
| 2010/0248257 A1 | 9/2010 | Jacobsen et al. |
| 2010/0254589 A1 | 10/2010 | Gallagher et al. |
| 2010/0256504 A1 | 10/2010 | Moreau-Gaudry et al. |
| 2010/0266172 A1 | 10/2010 | Shlomi |
| 2010/0267571 A1 | 10/2010 | Watanabe et al. |
| 2010/0278405 A1 | 11/2010 | Kakadiaris et al. |
| 2010/0284918 A1 | 11/2010 | Rohlff |
| 2010/0285467 A1 | 11/2010 | Lohse et al. |
| 2010/0290868 A1 | 11/2010 | Virag et al. |
| 2010/0301230 A1 | 12/2010 | Filkins et al. |
| 2010/0303324 A1 | 12/2010 | Lang et al. |
| 2010/0305907 A1 | 12/2010 | Fitz et al. |
| 2010/0312092 A1 | 12/2010 | Maurice et al. |
| 2010/0317118 A1 | 12/2010 | Masujima et al. |
| 2010/0317541 A1 | 12/2010 | Addington et al. |
| 2010/0323907 A1 | 12/2010 | Ton-That et al. |
| 2011/0003706 A1 | 1/2011 | Almouzni et al. |
| 2011/0008765 A1 | 1/2011 | Vacanti et al. |
| 2011/0008884 A1 | 1/2011 | Morales |
| 2011/0014267 A1 | 1/2011 | Everland et al. |
| 2011/0020317 A1 | 1/2011 | Miller et al. |
| 2011/0026803 A1 | 2/2011 | Can et al. |
| 2011/0027777 A1 | 2/2011 | Joergensen et al. |
| 2011/0039101 A1 | 2/2011 | Chang et al. |
| 2011/0040169 A1 | 2/2011 | Kamen et al. |
| 2011/0040176 A1 | 2/2011 | Razansky et al. |
| 2011/0045459 A1 | 2/2011 | Mischel et al. |
| 2011/0060766 A1 | 3/2011 | Ehlke et al. |
| 2011/0064784 A1 | 3/2011 | Mullens et al. |
| 2011/0075914 A1 | 3/2011 | Filkins et al. |
| 2011/0081056 A1 | 4/2011 | Salafia |
| 2011/0091086 A1 | 4/2011 | Seko et al. |
| 2011/0091088 A1 | 4/2011 | Wilson et al. |
| 2011/0091907 A1 | 4/2011 | Kataoka et al. |
| 2011/0102549 A1 | 5/2011 | Takahashi et al. |
| 2011/0110859 A1 | 5/2011 | Rohlff |
| 2011/0114719 A1 | 5/2011 | Graupner et al. |
| 2011/0118529 A1 | 5/2011 | Balakin |
| 2011/0118596 A1 | 5/2011 | Vining et al. |
| 2011/0125016 A1 | 5/2011 | Lazebnik et al. |
| 2011/0136757 A1 | 6/2011 | Ahmed |
| 2011/0137175 A1 | 6/2011 | Hossack et al. |
| 2011/0144047 A1 | 6/2011 | Bruenner et al. |
| 2011/0144752 A1 | 6/2011 | Defelice et al. |
| 2011/0150293 A1 | 6/2011 | Bower et al. |
| 2011/0150313 A1 | 6/2011 | Su et al. |
| 2011/0152121 A1 | 6/2011 | Park et al. |
| 2011/0158494 A1 | 6/2011 | Bar-Shalev et al. |
| 2011/0160576 A1 | 6/2011 | Bower et al. |
| 2011/0166455 A1 | 7/2011 | Cully et al. |
| 2011/0176710 A1 | 7/2011 | Mattiuzzi et al. |
| 2011/0177077 A1 | 7/2011 | Hoff et al. |
| 2011/0177500 A1 | 7/2011 | Winther et al. |

(56) References Cited

U.S. PATENT DOCUMENTS

| | | |
|---|---|---|
| 2011/0177590 A1 | 7/2011 | Clyne et al. |
| 2011/0183349 A1 | 7/2011 | Chen et al. |
| 2011/0194670 A1 | 8/2011 | Borghese et al. |
| 2011/0195026 A1 | 8/2011 | Rohlff et al. |
| 2011/0196663 A1 | 8/2011 | Doyle et al. |
| 2011/0200171 A1 | 8/2011 | Beetel et al. |
| 2011/0200240 A1 | 8/2011 | Van Herpen et al. |
| 2011/0200497 A1 | 8/2011 | Ljungmann et al. |
| 2011/0201928 A1 | 8/2011 | Duric et al. |
| 2011/0201932 A1 | 8/2011 | Duric et al. |
| 2011/0212090 A1 | 9/2011 | Pedersen et al. |
| 2011/0216953 A1 | 9/2011 | Callahan et al. |
| 2011/0217274 A1 | 9/2011 | Reld |
| 2011/0217296 A1 | 9/2011 | Carpen et al. |
| 2011/0230664 A1 | 9/2011 | Petersen |
| 2011/0230768 A1 | 9/2011 | Nir et al. |
| 2011/0232448 A1 | 9/2011 | McCormick |
| 2011/0235172 A1 | 9/2011 | Ljungmann et al. |
| 2011/0235875 A1 | 9/2011 | Filkins et al. |
| 2011/0236411 A1 | 9/2011 | Scholler et al. |
| 2011/0238322 A1 | 9/2011 | Song |
| 2011/0245197 A1 | 10/2011 | Ahmed |
| 2011/0249910 A1 | 10/2011 | Henderson et al. |
| 2011/0257529 A1 | 10/2011 | Casciaro et al. |
| 2011/0257588 A1 | 10/2011 | Knowlton |
| 2011/0261367 A1 | 10/2011 | Gmitro et al. |
| 2011/0273767 A1 | 11/2011 | Glaser et al. |
| 2011/0276159 A1 | 11/2011 | Chun et al. |
| 2011/0286654 A1 | 11/2011 | Krishnan |
| 2011/0290899 A1 | 12/2011 | Petrovich |
| 2011/0306047 A1 | 12/2011 | Matthiesen |
| 2011/0308334 A1 | 12/2011 | Schmitt et al. |
| 2011/0308392 A1 | 12/2011 | Schmitt et al. |
| 2011/0310384 A1 | 12/2011 | Georgakoudi et al. |
| 2011/0318380 A1 | 12/2011 | Brix et al. |
| 2012/0002879 A1 | 1/2012 | Kanda et al. |
| 2012/0015939 A1 | 1/2012 | Campbell |
| 2012/0017830 A1 | 1/2012 | Ljungmann et al. |
| 2012/0021439 A1 | 1/2012 | Papin et al. |
| 2012/0029358 A1 | 2/2012 | Lin |
| 2012/0045770 A1 | 2/2012 | Pongracz et al. |
| 2012/0045790 A1 | 2/2012 | Van Dijk et al. |
| 2012/0050517 A1 | 3/2012 | Harding et al. |
| 2012/0058509 A1 | 3/2012 | Leininger et al. |
| 2012/0063665 A1 | 3/2012 | Wang et al. |
| 2012/0064050 A1 | 3/2012 | Calle et al. |
| 2012/0068928 A1 | 3/2012 | Bruss et al. |
| 2012/0069049 A1 | 3/2012 | Howe et al. |
| 2012/0070814 A1 | 3/2012 | Iida et al. |
| 2012/0072452 A1 | 3/2012 | Stratman et al. |
| 2012/0107763 A1 | 5/2012 | Adams et al. |
| 2012/0108452 A1 | 5/2012 | Neujahr et al. |
| 2012/0109613 A1 | 5/2012 | Boyden et al. |
| 2012/0116524 A1 | 5/2012 | Walker et al. |
| 2012/0122087 A1 | 5/2012 | Li et al. |
| 2012/0123275 A1 | 5/2012 | Ortonne |
| 2012/0130226 A1 | 5/2012 | Huizenga et al. |
| 2012/0134603 A1 | 5/2012 | Pang et al. |
| 2012/0135445 A1 | 5/2012 | Gartzia et al. |
| 2012/0135449 A1 | 5/2012 | Xie et al. |
| 2012/0135458 A1 | 5/2012 | Corwin et al. |
| 2012/0147010 A1 | 6/2012 | Schmidt et al. |
| 2012/0149110 A1 | 6/2012 | Kitamura et al. |
| 2012/0156182 A1 | 6/2012 | Ahlfors |
| 2012/0157831 A1 | 6/2012 | Waki |
| 2012/0157837 A1 | 6/2012 | Nagata et al. |
| 2012/0164648 A1 | 6/2012 | Han et al. |
| 2012/0167786 A1 | 7/2012 | Laugharn, Jr. |
| 2012/0170022 A1 | 7/2012 | Paul |
| 2012/0179293 A1 | 7/2012 | Feingold et al. |
| 2012/0189176 A1 | 7/2012 | Giger et al. |
| 2012/0190078 A1 | 7/2012 | Gatenholm et al. |
| 2012/0191020 A1 | 7/2012 | Vitek et al. |
| 2012/0196275 A1 | 8/2012 | Mezghanni et al. |
| 2012/0200694 A1 | 8/2012 | Garsha et al. |
| 2012/0201723 A1 | 8/2012 | Loeffler et al. |
| 2012/0207366 A1 | 8/2012 | Liu |
| 2012/0208184 A1 | 8/2012 | Ragan |
| 2012/0220034 A1 | 8/2012 | Ahlfors et al. |
| 2012/0225013 A1 | 9/2012 | Dennis et al. |
| 2012/0226154 A1 | 9/2012 | Brown et al. |
| 2012/0231967 A1 | 9/2012 | Sood et al. |
| 2012/0236120 A1 | 9/2012 | Kramer et al. |
| 2012/0244556 A1 | 9/2012 | Bakre |
| 2012/0245461 A1 | 9/2012 | Brown et al. |
| 2012/0257811 A1 | 10/2012 | Metzger et al. |
| 2012/0258126 A1 | 10/2012 | Schoeller et al. |
| 2012/0264161 A1 | 10/2012 | Schoeller et al. |
| 2012/0269416 A1 | 10/2012 | Waki et al. |
| 2012/0276552 A1 | 11/2012 | Lu |
| 2012/0277899 A1 | 11/2012 | Chun et al. |
| 2012/0288936 A1 | 11/2012 | Ahlfors et al. |
| 2012/0303083 A1 | 11/2012 | Agnetti et al. |
| 2012/0309044 A1 | 12/2012 | Ljungmann et al. |
| 2012/0310422 A1 | 12/2012 | Winther et al. |
| 2012/0318075 A1 | 12/2012 | Thiem et al. |
| 2012/0318808 A1 | 12/2012 | McCormick |
| 2012/0321633 A1 | 12/2012 | Jarsch et al. |
| 2012/0322070 A1 | 12/2012 | Nevo |
| 2012/0325826 A1 | 12/2012 | McCormick |
| 2012/0330141 A1 | 12/2012 | Brown et al. |
| 2013/0004990 A1 | 1/2013 | Williamson |
| 2013/0011854 A1 | 1/2013 | O'Leary et al. |
| 2013/0016886 A1 | 1/2013 | Schoenmeyer et al. |
| 2013/0019725 A1 | 1/2013 | Magavi et al. |
| 2013/0023038 A1 | 1/2013 | Testa et al. |
| 2013/0023764 A1 | 1/2013 | Brown et al. |
| 2013/0029409 A1 | 1/2013 | Sweet et al. |
| 2013/0040339 A1 | 2/2013 | Ljungmann et al. |
| 2013/0058871 A1 | 3/2013 | Kim |
| 2013/0063583 A1 | 3/2013 | Molnar et al. |
| 2013/0063727 A1 | 3/2013 | Xu |
| 2013/0073387 A1 | 3/2013 | Heath |
| 2013/0078648 A1 | 3/2013 | Moehrle |
| 2013/0078670 A1 | 3/2013 | Williamson, IV et al. |
| 2013/0084567 A1 | 4/2013 | Buchanan et al. |
| 2013/0096392 A1 | 4/2013 | Adams |
| 2013/0096948 A1 | 4/2013 | Parkinson et al. |
| 2013/0101606 A1 | 4/2013 | Zhang et al. |
| 2013/0102494 A1 | 4/2013 | Jouhanneaud |
| 2013/0114873 A1 | 5/2013 | Chaoui et al. |
| 2013/0131136 A1 | 5/2013 | Ghinea et al. |
| 2013/0137136 A1 | 5/2013 | Cobb et al. |
| 2013/0143222 A1 | 6/2013 | Ellsworth et al. |
| 2013/0143763 A1 | 6/2013 | Gustavson et al. |
| 2013/0158405 A1 | 6/2013 | Bagge |
| 2013/0163002 A1 | 6/2013 | Kim et al. |
| 2013/0164762 A1 | 6/2013 | Emile et al. |
| 2013/0166072 A1* | 6/2013 | Yang .................. G01N 1/06 700/275 |
| 2013/0166345 A1 | 6/2013 | Chirica et al. |
| 2013/0183708 A1 | 7/2013 | Ljungmann et al. |
| 2013/0183710 A1 | 7/2013 | Reifenberger et al. |
| 2013/0186248 A1 | 7/2013 | Heid |
| 2013/0190592 A1 | 7/2013 | Coppini et al. |
| 2013/0190594 A1 | 7/2013 | Oraevsky et al. |
| 2013/0190595 A1 | 7/2013 | Oraevsky et al. |
| 2013/0203103 A1 | 8/2013 | Feingold et al. |
| 2013/0210648 A1 | 8/2013 | Hewitt et al. |
| 2013/0216114 A1 | 8/2013 | Courtney et al. |
| 2013/0217108 A1 | 8/2013 | Key et al. |
| 2013/0218978 A1 | 8/2013 | Weinstein et al. |
| 2013/0222899 A1 | 8/2013 | Fox et al. |
| 2013/0229663 A1 | 9/2013 | Yang et al. |
| 2013/0230224 A1 | 9/2013 | Claude et al. |
| 2013/0230853 A1 | 9/2013 | Lohse |
| 2013/0236879 A1 | 9/2013 | Berry et al. |
| 2013/0240537 A1 | 9/2013 | McCormick |
| 2013/0252240 A1 | 9/2013 | Cutler et al. |
| 2013/0268074 A1 | 10/2013 | Vowles |
| 2013/0273560 A1 | 10/2013 | Cooks et al. |
| 2013/0287645 A1 | 10/2013 | Shaikh et al. |
| 2013/0289381 A1 | 10/2013 | Oraevsky et al. |
| 2013/0294676 A1 | 11/2013 | Parvin et al. |

(56) References Cited

U.S. PATENT DOCUMENTS

| | | | |
|---|---|---|---|
| 2013/0315466 A1 | 11/2013 | Drell | |
| 2013/0317317 A1 | 11/2013 | Ellsworth et al. | |
| 2013/0321814 A1 | 12/2013 | Zhan et al. | |
| 2013/0323750 A1 | 12/2013 | Wu et al. | |
| 2013/0324485 A1 | 12/2013 | Addington et al. | |
| 2013/0328869 A1 | 12/2013 | Choi et al. | |
| 2013/0330252 A1 | 12/2013 | Winther et al. | |
| 2013/0330325 A1 | 12/2013 | Grabe et al. | |
| 2013/0331734 A1 | 12/2013 | Keast et al. | |
| 2013/0335548 A1 | 12/2013 | Kim et al. | |
| 2013/0337441 A1 | 12/2013 | Lohse | |
| 2013/0345167 A1 | 12/2013 | Ahmed | |
| 2013/0345559 A1 | 12/2013 | Haemmerich et al. | |
| 2014/0001337 A1 | 1/2014 | Corwin et al. | |
| 2014/0004542 A1 | 1/2014 | Qi et al. | |
| 2014/0004552 A1 | 1/2014 | Favuzzi et al. | |
| 2014/0016845 A1 | 1/2014 | Gazit et al. | |
| 2014/0022250 A1 | 1/2014 | Mansi et al. | |
| 2014/0024024 A1 | 1/2014 | Sood et al. | |
| 2014/0030757 A1 | 1/2014 | Schiffenbauer | |
| 2014/0031677 A1 | 1/2014 | Iftimia et al. | |
| 2014/0037044 A1 | 2/2014 | Ning et al. | |
| 2014/0037048 A1 | 2/2014 | Shores et al. | |
| 2014/0038169 A1 | 2/2014 | Lohse et al. | |
| 2014/0038221 A1 | 2/2014 | Bergkvist et al. | |
| 2014/0038232 A1 | 2/2014 | Key et al. | |
| 2014/0038291 A1 | 2/2014 | Ahlfors et al. | |
| 2014/0045251 A1 | 2/2014 | Sood et al. | |
| 2014/0051118 A1 | 2/2014 | Matthiesen et al. | |
| 2014/0051168 A1 | 2/2014 | Vukasinovic | |
| 2014/0055853 A1 | 2/2014 | Corwin et al. | |
| 2014/0066760 A1 | 3/2014 | Duric et al. | |
| 2014/0071238 A1 | 3/2014 | Mertens et al. | |
| 2014/0080145 A1 | 3/2014 | Lohse | |
| 2014/0094806 A1 | 4/2014 | Johnson et al. | |
| 2014/0099631 A1 | 4/2014 | Testa et al. | |
| 2014/0113328 A1 | 4/2014 | Williamson | |
| 2014/0120011 A1 | 5/2014 | Eckert et al. | |
| 2014/0228707 A1* | 8/2014 | Brieu | A61B 5/00 600/567 |
| 2014/0356876 A1* | 12/2014 | Ragan | G01N 1/06 435/6.12 |
| 2015/0138532 A1* | 5/2015 | Goodman | G01N 1/286 356/36 |
| 2015/0287194 A1* | 10/2015 | Schoenmeyer | G06T 7/0012 382/128 |
| 2016/0290895 A1 | 10/2016 | Daniel et al. | |

FOREIGN PATENT DOCUMENTS

| | | |
|---|---|---|
| CN | 102423264 A | 4/2012 |
| CN | 102460154 A | 5/2012 |
| CN | 102565428 A | 7/2012 |
| CN | 102590155 A | 7/2012 |
| CN | 102625022 A | 8/2012 |
| CN | 101477241 B | 10/2012 |
| CN | 103403835 A | 11/2013 |
| CN | 204065544 U | 12/2014 |
| CN | 104321632 A | 1/2015 |
| EP | 1316790 A2 | 6/2003 |
| EP | 2765557 A2 | 8/2014 |
| EP | 2765557 A2 | 8/2014 |
| EP | 2765557 B1 | 7/2019 |
| JP | 2001013046 A | 1/2001 |
| JP | 2014529373 A | 11/2014 |
| TW | 200401889 A | 2/2004 |
| TW | 201016844 A | 5/2010 |

OTHER PUBLICATIONS

McIlwain, H. Techniques in tissue metabolism. Biochem Journal. Dec. 31, 1961; 78:213-218. XP055374880.

Office Action dated Apr. 19, 2017 for U.S. Appl. No. 14/529,503.

The Physics Classroom(/) Physics Tutorial(/class) "Vectors—Motion and Forces in Two Dimensions(/class/vectors)" Initial Velocity Components, available, on Apr. 4, 2017, at http://www.physicsclassroom.com/class/vectors/Lesson-2/initial-Velocity-Components.

European Search Report dated Nov. 9, 2016 for EP Application No. 16178713.0.

Osechinskiy, et al., Quantitative comparison of high-resolution MRI and myelin-stained histology of the human cerebral cortex, Proceedings of the 31st annual international conference of the IEEE engineering in the medicine and biology society: engineering the future of biomedicine, EMBC. 2009. pp. 85-89.

Biserkov, et al. Mini-microtome for preparing serial sections directly on a light microscope stage. Journal of Microscopy, Jul. 1995, vol. 179, Part 1, pp. 90-93.

Bracegirdle, B. The development of biological preparative techniques for light microscopy. Journal of Microscopy, Sep. 1989, vol. 155, Part 3, pp. 307-318.

Brismar, et al. Method of estimating the thickness of fluorescent structures using a confocal scanning laser microscope. Journal of Microscopy, Nov. 1996, vol. 184, Part 2, pp. 106-116.

Choe, et al. Comparison of Knife-Edge Scanning Microscopy with Micro-Optical Sectioning Tomography. Department of Computer Science and Engineering, Texas A&M University. Dec. 3, 2010.

Choe, et al. Comparison of Knife-Edge Scanning Microscopy with Micro-Optical Sectioning Tomography. Department of Computer Science and Engineering, Texas A&M University. Nov. 12, 2010.

Choe, et al. Knife-Edge Scanning Microscopy: High-Throughput Imaging and Analysis of Massive Volumes of Biological Microstructures. Aug. 31, 2008.

Department of Computer Science Multimedia Gallery. 3D Reconstruction of Neuron Morphology and Microvasculature. Brain Networks Laboratory, 2004. Http://research.cs.tamu.edu/bnl/static/galleryRecon.html. Accessed Feb. 6, 2015.

Department of Computer Science Multimedia Gallery. Dataset Fly-throughs. Brain Networks Laboratory, 2004. Http://research.cs.tamu.edu/bnl/static/galleryData.html. Accessed Feb. 6, 2015.

Department of Computer Science Multimedia Gallery. Knife-Edge Scanning Microscope. Brain Networks Laboratory, 2004. Http://research.cs.tamu.edu/bnl/static/galleryKesm.html. Accessed Feb. 6, 2015.

European search report and opinion dated Aug. 4, 2016 for EP Application No. 16162075.2.

Hsu, J. Chinese Brain-imaging device a suspected copy of U.S. Device. Live Science Nov. 15, 2010.

International search report and written opinion dated Feb. 9, 2015 for PCT Application No. US2014/063544.

Khokhlov, et al. A piezoelectric vibroknife for the microtome. Instruments and experimental techniques, Mar. 1997, vol. 40, No. 3, pp. 422-423.

Kokubo, et al. Development of an automatic thin sectioning system for light microscopy. Japanese Journal of Medical Electronics and Biological Engineering, Jun. 2000, vol. 38, No. 2, pp. 118-126.

Kwon, et al. Automated Lateral Sectioning for Knife-Edge Scanning Microscopy. ISBI 2008, pp. 1371-1374.

Li, et al. Micro-Optical Sectioning Tomography to Obtain a High-Resolution Atlas of the Mouse Brain. Science 3, Dec. 2010, vol. 330, No. 6009, pp. 1404-1408.

Mayerich, et al. Knife-edge scanning microscopy for imaging and reconstruction of three-dimensional anatomical structures of the mouse brain. Journal of Microscopy, 231: 134-143, 2008.

McCormick, B. Development of Brain Tissue Scanner. Brain Networks Laboratory Technical Report, Department of Computer Science, Texas A&M Universtiy, Mar. 18, 2002, pp. 1-27.

Notice of Allowance dated Jan. 16, 2004 for U.S. Appl. No. 09/948,469.

Odgaard, et al. Direct method for fast three-dimensional serial reconstruction. Journal of Microscopy, Sep. 1990, vol. 159, Part 3, pp. 335-342.

Office action dated Jul. 11, 2003 for U.S. Appl. No. 09/948,469.

Office action dated Sep. 12, 2016 for U.S. Appl. No. 14/529,503.

(56) References Cited

OTHER PUBLICATIONS

Wu, et al. Pre-processing Techniques for Grid Stereo Images in the 3D Surface Data Acquisition System. SPIE vol. 5254, 2003, pp. 559-566.
Chinese Patent Office, Application No. 2016010534830.1, Foreign Office Action dated Jul. 3, 2018.
Chinese Patent Office, Application No. 2016010534830.1, Foreign Office Action dated Mar. 28, 2019.
Japanese Patent Office, Application No. 2016-135828, Foreign Office Action dated Jun. 23, 2020.

* cited by examiner

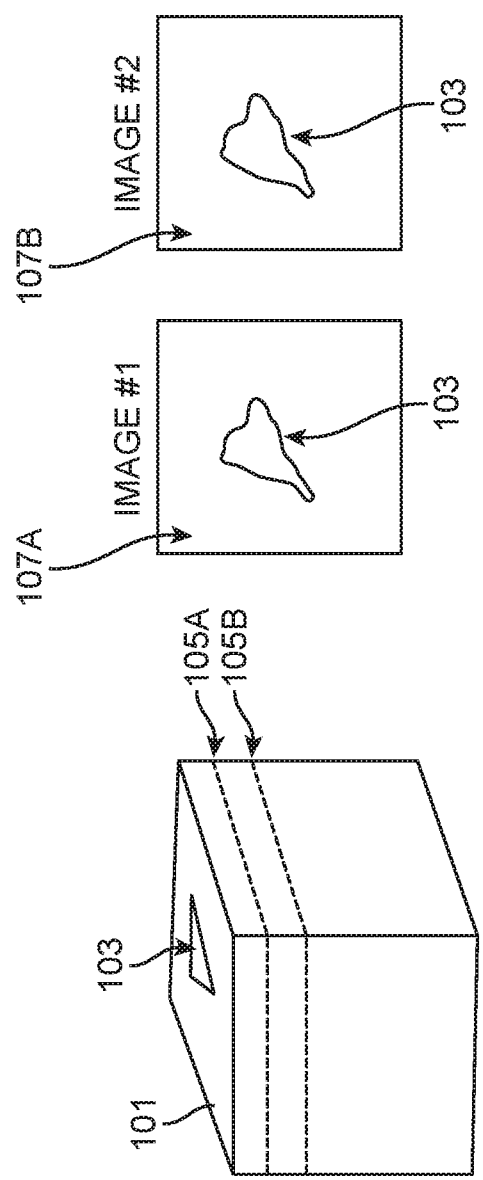
FIG. 1D1

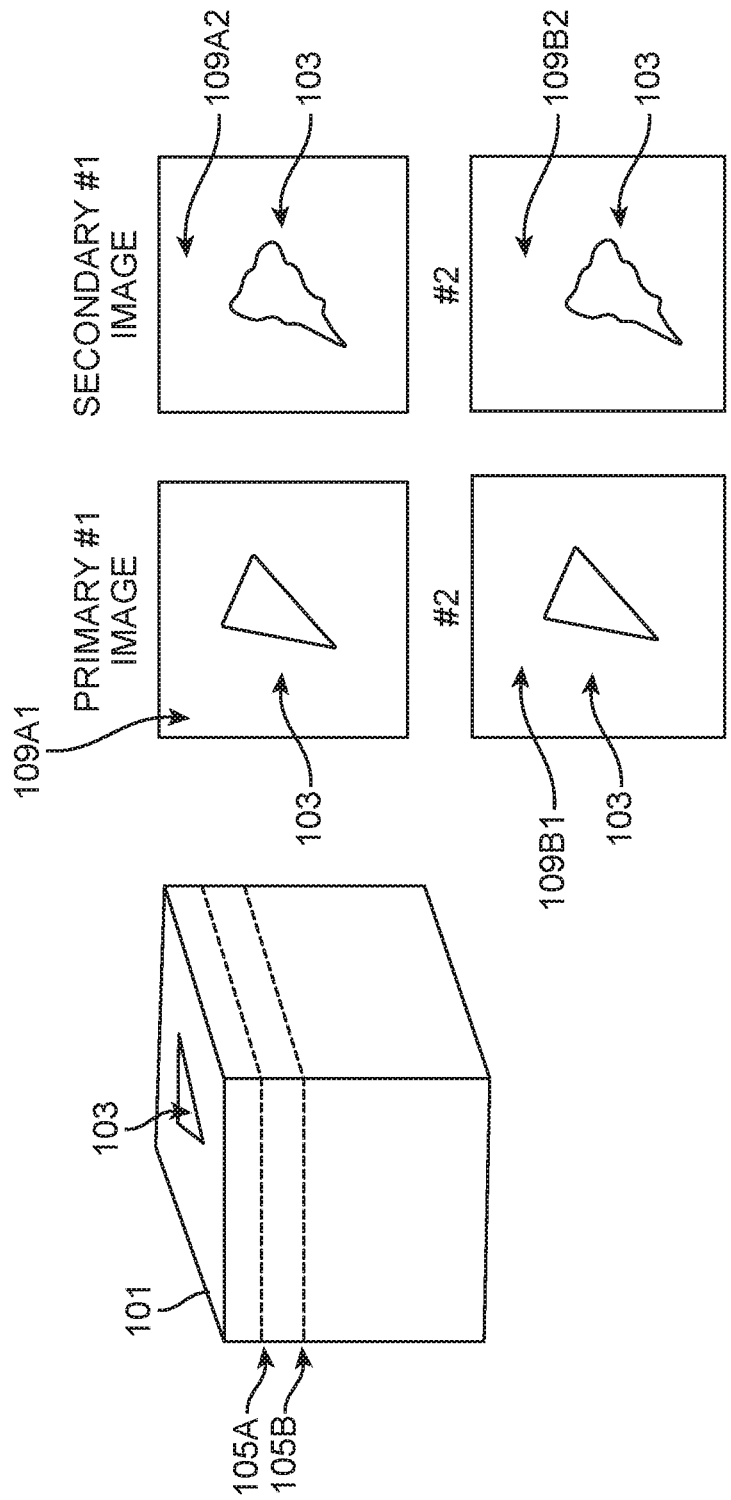
FIG. 1D2

SPATIAL MULTIPLEXING OF HISTOLOGICAL STAINS

CROSS-REFERENCE

This application claims the benefit of U.S. Provisional Application No. 62/190,931, filed Jul. 10, 2015, which application is incorporated herein by reference.

BACKGROUND

The present disclosure generally relates to a method of slicing, imaging, and staining tissue for diagnostic or research purposes. In particular, the present disclosure relates to Serial Section Microscopy, the sectioning of biological tissue and other material samples using a microtome, and more specifically, a method of imaging tissue samples stained with immunohistochemical antigens.

Immunohistochemistry is a process in which a set of antigens are applied to a section of biological tissue. Immunohistochemical staining is commonly used to identify abnormal cells, employing antibodies to test for certain antigens in a sample of tissue. The antibody is usually linked to a radioactive substance or a dye that causes the antigens in the tissue to become visible under a microscope, and this process is generally done in a panel or series of different stains to detect various cancer cell strains.

The present disclosure converges and optimizes of several different workflows that are traditionally used in immunohistochemistry by using the novel methods and processes made possible with the KESM technology. By presenting the following three studies of traditional workflows that represent the current state of the art, the novel and useful method as described herein can be better understood.

SUMMARY

The present disclosure generally relates to systems and methods for an imaging an object with a microtome and applying immunohistochemical stains, in order to detect certain biological markers for medical diagnosis or research. In particular, the present disclosure relates to using Serial Section Microscopy for these diagnostics, by sectioning biological tissue and other material samples using a Knife Edge Scanning Microscope and applying stains to individual sections, and using a spatial multiplexing method enabled by the Knife Edge Scanning technology to compare various stains and reactions across a sample.

The following concerns techniques for rapid pathological and/or histological examination of a tissue sample using multiple contrasting agents. By performing an additional imaging step before tissue handling made possible by the Knife Edge Scanning Microscope, the fundamental shape of the imaged object can be captured before physical or chemical deformations are made. Thus, the deformed slice may be registered back into the original coordinate system of the sample. This can also present a unique ability to better co-locate biological markers across many serial sections of a single sample, and can create a more accurate representation of the tissue as a whole by using the intermediate imaging step to re-map individual sections to each other, after chemical or mechanical treatment. This can provide unique advantages by allowing multiple contrast agents to be compared quickly across a sample more quickly than the traditional workflow, with less distortions.

Other goals and advantages of the disclosure will be further appreciated and understood when considered in conjunction with the following description and accompanying drawings. While the following description may contain specific details describing particular embodiments of the disclosure, they should not be construed as limitations to the scope of the disclosure but rather as an exemplification of preferable embodiments. For each aspect of the disclosure, many variations are possible as suggested herein that are known to those of ordinary skill in the art. A variety of changes and modifications can be made within the scope of the disclosure without departing from the spirit thereof.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 1D1 is a is a schematic illustrating how image distortions occur in traditional workflow using the current state of the art.

FIG. 1D2 is a schematic illustrating how spatially mulitplexing using the technology described herein improves the process of aligning image stacks by aligning to a non-distorted image.

DETAILED DESCRIPTION

Figure 1A:
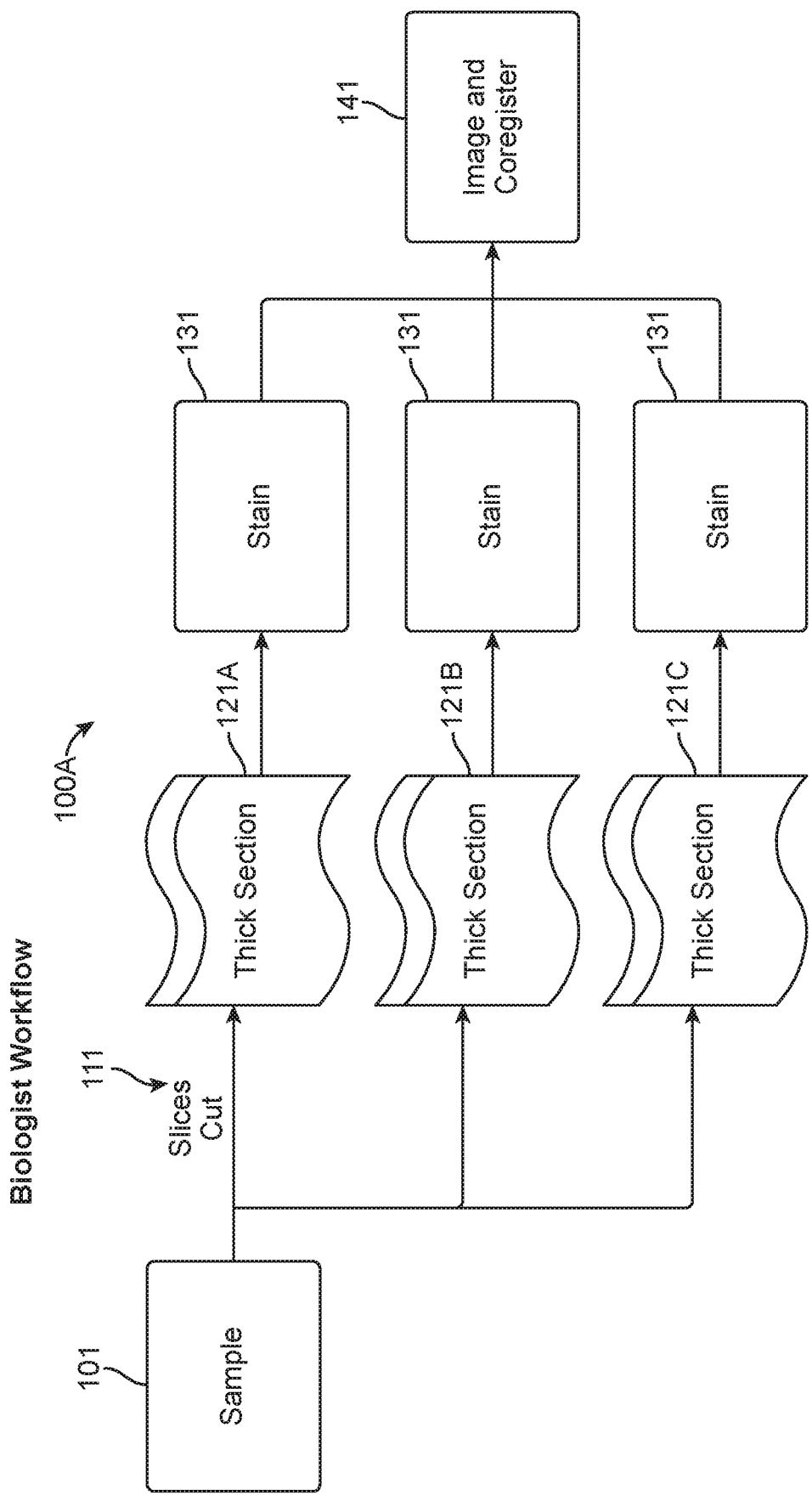
FIG. 1A is a schematic illustrating the typical anatomist's workflow using the current state of the art.

Improved systems and methods are disclosed herein by comparison to the three traditional processes of slicing, staining and imaging tissue samples as described above. The present disclosure includes improvements upon the three aforementioned workflows by introducing an additional imaging step(s) at or before the time of sectioning, enabled by the KESM technology.

Definitions

"Immunohistochemistry" may refer to the application of antigens or proteins in tissue sections by the use of labeled antibodies as specific reagents that cause antigen-antibody interactions, which can be visualized by a marker such as fluorescent dye or stain.

"Serial Section Microscopy" may refer to the practice of taking serial sections with a microtome and imaging them, traditionally by mounting the slices to glass and staining.

"Knife Edge Scanning Microscope" or "KESM" may refer to a microscope that performs Serial Section Microscopy in an automated fashion. See U.S. Pat. No. 6,744,572.

"Section" or "slice" may refer to a single strip of contiguous material that was removed from the block face by means of a relative motion between the sample and the knife.

"Microtome" may refer to a device in which a block of material is precisely cut such that a very thin layer of material is removed, or sectioned, from the surface of the block. Similarly, the term "microtomy" may apply to the operation of microtomes.

"Imagery" may include any technique designed to measure an "image", a spatial map of an optical or electronic response. This can include optical or electron microscopy techniques.

"Imaging" may generally refer to data collection in order to generate a visualization of a given area.

"Registration" or "co-registration" may refer to a computational step in which images are aligned, stretched, and deformed to match one another. In reference to Serial Sectioning Microscopy, this step can correct for tissue deformation from slicing, mounting, and chemical treatments.

"Multiplex" or "multiplexing" may refer to a method of selecting one location within a matrix by having two selective addressing systems on both sides of the matrix, thus needing only 2N selectors to address NA2 locations.

"Stain" may refer to a chemical treatment, which aims to change the photonic response of all or parts of a medium, by methods including but not limited to attaching a pigment, a genetically expressed flourophore, or chemistry designed to modify the target structure to be imaged. This may include but is not limited to traditional light microscopy stains, contrast agents used in immunohistochemistry (IHC) and in situ hybridization (ISH) labeling techniques.

"Molecular Diagnostic" may refer to a form of chemical test or assay, which takes a sample of tissue and identifies biological markers to make a diagnostic.

"Transformation" may refer to the re-mapping of a single point in an image from the unstained image to another stained image.

"Interpolation" may encompass methods for selective spatial sampling of a numerical value derived from another numerical field. Methods commonly used may include "nearest-neighbor" interpolation, linear, polynomial, or b-spline based techniques. These are generally used to compute discreet "interpolant" values of a transformed image, or approximate the value of a function at a given spatial coordinate.

Distortions

The process of capturing and mounting sections from a microtome to a glass slide may physically distort the tissue. The distortion can be a warping of the thin and delicate tissue, a folding of the sections, or even tearing. The warping can prevent simple alignment of serial sections, as the microscopic features may not line up properly from section to section. Typically, the distortions must be corrected using a combination of manual editing and software, where registration marks are chosen on the adjacent images and software aligns the registration marks. This process is often slow and difficult, and can prevent the more widespread adoption of serial sectioning.

Staining and Slice Thickness

Controlling slice thickness can be important for several reasons:

1. Maintaining the structural/architectural integrity of the section for subsequent handling, staining, mounting, and processing.
2. Ensuring that the section is an appropriate thickness to the structures being resolved. The slice should be thick enough so that unique features fit within the slice. In cell characterization, the slice is typically a thickness, which allows 1-2 layers of cells in plane. If it is too thick, many layers of cells can obscure the ability to obscure cell level detail. Similarly, if the slice it too thin relevant features within a singular cell layer may be truncated.
3. Ensuring that the slice is thin enough of the chemical kinetics of staining to adequately label the associated features. Many contrast agents employ large molecules, which may be limited in the amount of tissue through which they are able to diffuse and correspondingly label.

Similarly contrast agents, which can depend on chemical-kinetics of the base material, may behave differently for thick or thin sections.

It is common practice in histology or pathology labs to cut slices of different thickness for different staining/contrasting techniques. This is especially true when rapid results are needed (thin slices typically can be stained more quickly), or complex chemistries are employed in the staining as in IHC or ISH methods.

The Anatomist Workflow

There are many reasons that a biologist might want to measure a tissue property across a three dimensional volume of space. To do this using the current state of the art, several slices would be cut, stained, and co-registered against one and other. FIG. 1A is a diagram that illustrates the typical anatomist's workflow 100A employing the current state of the art. In a step 111, a sample 101 may be sliced into one or more thick sections such as a first thick section 121A, a second thick section 121B, and a third thick section 121B. The thick sections 121A, 121B, 121C may be stained in a step 131 and the stained thick sections 121A, 121B, 121C may then be imaged and co-registered with one another in a step 141.

The Histologist/Pathologist Workflow

Figure 1B:
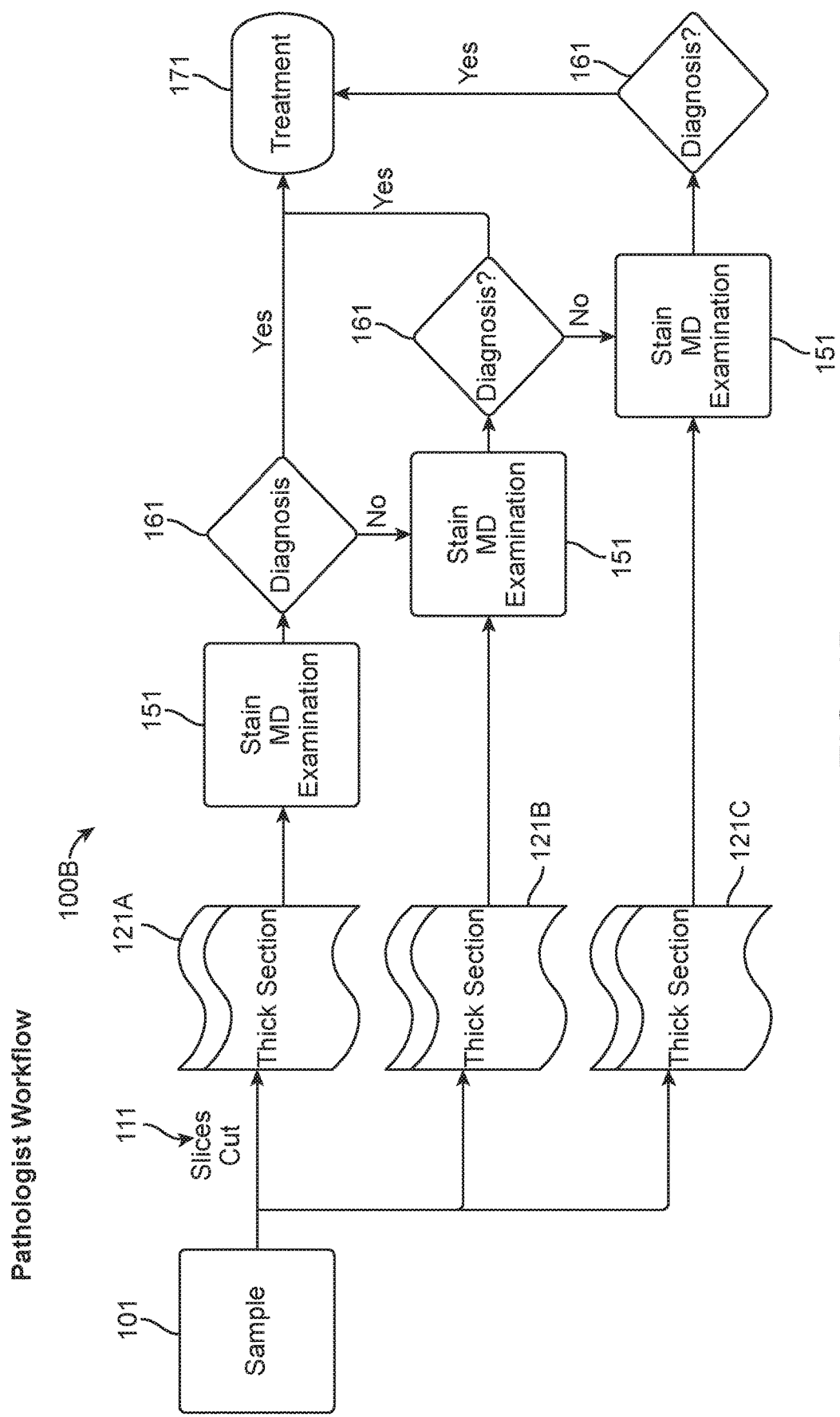
FIG. 1B is a schematic illustrating the typical histologist or pathologist's workflow using the current state of the art.

Similarly, when a histologist or pathologist is attempting to make a diagnosis of diseased tissue, several thick sections 121A, 121B, 121C may be cut. Then, one would be stained, imaged and examined in a step 151. Based on the imagery input from a medical professional, this process could be repeated several times before finally a diagnosis is made in a step 161, and the diagnosis of one of the thick sections may be used to inform the staining, imaging, and examination of further thick sections. The diagnosis of the stained thick sections may indicate an appropriate treatment for the patient in a step 171. FIG. 1B is a diagram that illustrates the typical histologist or pathologist's workflow 100B employing the current state of the art.

The Biologist Workflow

Figure 1C:
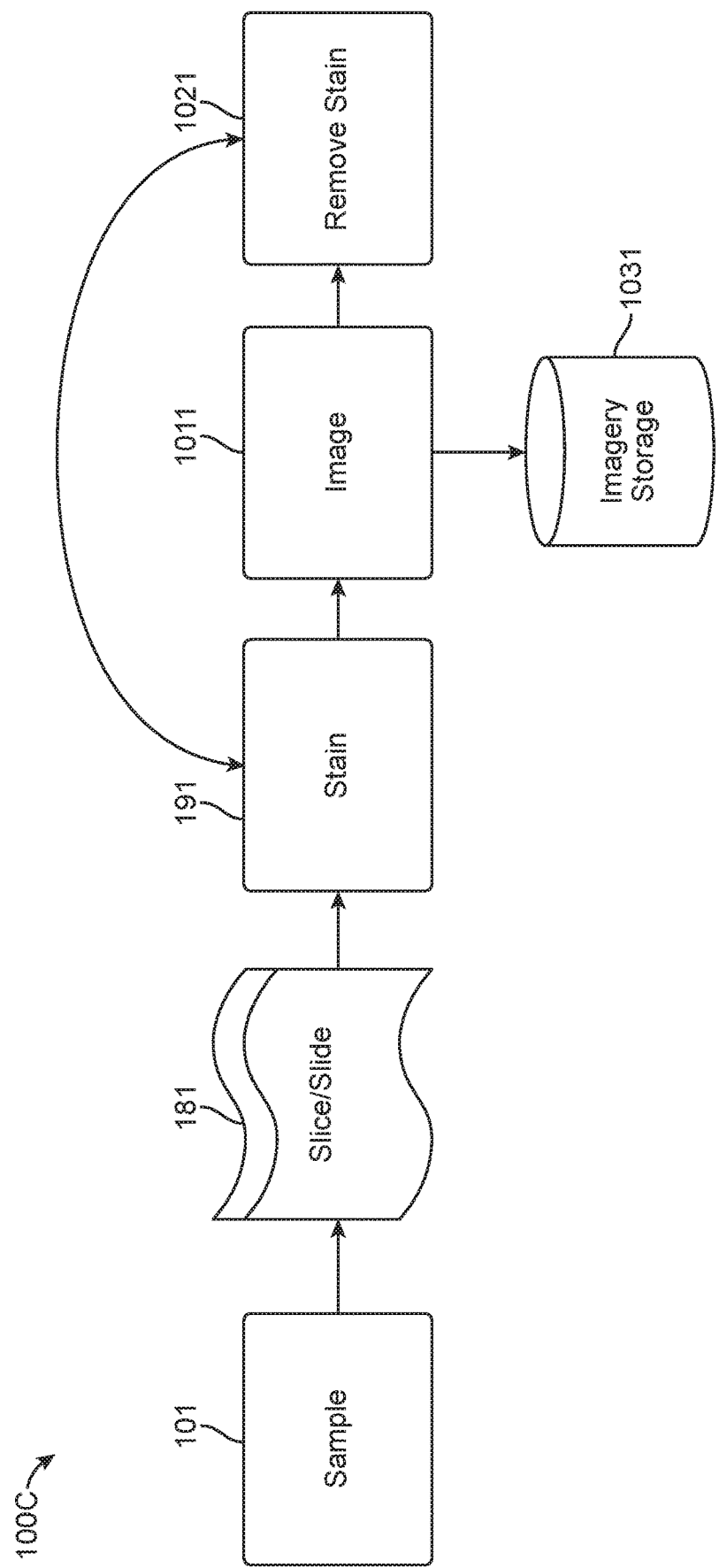
FIG. 1C is a schematic illustrating the typical biologist's workflow using the current state of the art.

Biological researchers typically employ an immunohistochemical staining technique where a particular piece of tissue is stained, imaged, then stripped clear of the stain from the section of tissue. The staining and stripping process can be repeated in order to image the immune or antigen reactions of a full panel of stains on the sample piece of tissue. FIG. 1C is a diagram that illustrates the typical biologist's workflow 100C employing the current state of the art. The sample 101 can be sliced and placed in a slide in a step 181. In a step 191, the slice/slide may be stained. In a step 1011, the stained slide/slice may be imaged. In a step 1031, the image may be stored. In a step 1021, the stain may be removed and the slide/slice may be stained once more in a step 191.

This process of putting down a stain, imaging, stripping the stain, re-staining, re-imaging the stain, then re-imaging again is known as serial multiplexing. This approach, which is commonly used by biologists in immunohistochemistry, is time consuming, often taking a week or longer to complete a full panel of antigen stains.

Another approach is differential staining of the next section, based on examination from a pathologist. This can lead to fairly long turnaround times, as well as needing increased interaction from the physician.

All of these approaches have fundamental drawbacks which the scope of this disclosure seeks to address:

The slide-mounting, staining, and imaging each introduce unique deformations, distortions, and artifacts in the slices which can make the final process of co-registration difficult, error prone, and time consuming.

There are often a large number of serial steps, each of which can involve significant human labor and attention to detail if high-quality reliable results are to be produced.

Given the 3D nature of a sample, the features can be changing across even adjacent slices, and automated feature extraction and warp correction has been difficult in larger samples.

The present disclosure describes systems and methods to decreases the human effort required to process multiple stains on a sample and increase the accuracy of the reconstructed products by introducing an additional imaging step enabled by the KESM technology as applied herein.

Post-Processing Distortions

In typical serial section microscopy, the slices are aligned using human annotation or algorithms, where the warping during mounting is corrected prior to reconstructions. The process typically involves the selection of registration marks, which are points that occur across adjacent sections. The registration points may be used to calculate a transformation function, which is applied to both images to bring the pixels in the images into alignment. Choosing registration marks across a series of images can be difficult, because each of the images in the stack is different from the next. Features also rarely cross exactly perpendicular to the cutting plane, so if the same features are chosen for registration marks, the features may drift spatially across the sections and thus for example an object at an incline may be misconstrued as being vertical.

As disclosed herein, the post-processing of images may be improved because the post-processing of distortions may be performed on two images of the exact same section, one without distortions and one or more with. Since the images are of the same slice, the same exact registration marks will occur on all images, making the selection process easier and more consistent. The same phenomenon can also reduce spatial drift that would otherwise occur for cylindrical features traveling at an incline relative to the cutting plane. FIG. 1D1 and FIG. 1D2 illustrate how distortions occur employing the current state of the art (FIG. 1D1) in comparison to how image post-processing may be improved with regard to these distortions as disclosed herein (FIG. 1D2).

As shown in FIG. 1D1, an object 103 may be in present in the sample 101 which may be sliced into two slices 105A and 105B. Images 107A, 107B may be generated for each slice 105A, 105B, respectively, showing the object 103 at different depths.

As shown in FIG. 1D2, an object 103 may be present in the sample 101 which may be sliced into two slices 105A and 105B. Primary and secondary images may be generated for each of the slices 105A, 105B (such as primary image 109A1 and secondary image 109A2 for primary slice 105A, and primary image 109B1 and secondary image 109B2 for secondary slice 105B.)

Primary Imaging

Figure 2A:
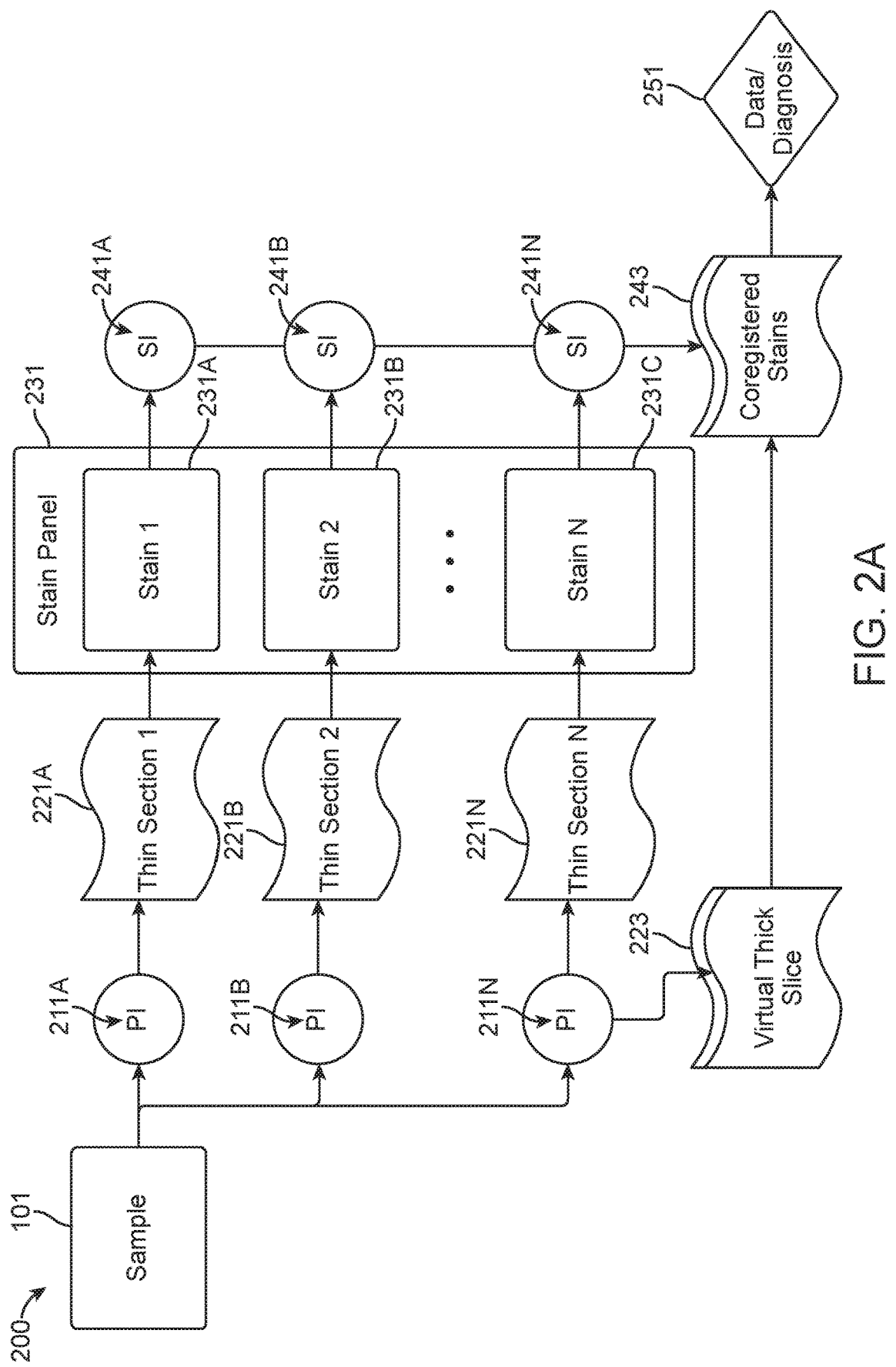
FIG. 2A is a schematic illustrating the steps for imaging a sample using the spatial multiplexing method described herein.

As described herein, the first step in this method comprises a Primary Imaging (PI) step, which may capture a view of the section before processing or post-processing distortions. This may be accomplished by imaging the sample before slicing or by imaging during slicing. The primary imaging may be performed with a KESM, which may capture an un-warped image on the block face during the slicing operation. These images may be referred to as X_N. By incorporating this PI step, the Secondary Imaging (SI) step can have a direct anchor to the actual original shape and location of the slice, which may enable better registration and analysis of stain reactions of a sample. FIG. 2A is a diagram that illustrates the imaging steps for the spatial multiplexing method 200. The sample 101 may be imaged in a primary imaging step 211A before a thin section 221A is sliced from the sample 101. Further primary imaging steps 211B to 211N may be performed before further slicing the sample to further thin sections 221B to 221N. The primary images may be collected and registered with one another to generate a virtual thick slice 223.

As described herein, after the PI steps (221A, 221B, . . . 221N), the slice(s) may be mounted on a glass slide and antigen or protein stains may then be applied in a step 231 to the sample slices for further analysis.

Secondary Imaging

Another aspect of the disclosure includes a Secondary Imaging (SI) step(s) 241A, 241B, . . . 241N. In the SI steps, the KESM may be used to image the stained slices of the sample 101 after a stain or a full panel of stains 231 has been applied. These step(s) may be repeated as many times as is desired, re-imaging the slices each time a new stain is applied to the sample. These images will be referred to as Y_n.

Reconstruction

Another aspect of the disclosure describes a reconstruction step. In the reconstruction step, various computations may be employed to create a reconstructed image across different stained images. As shown in FIG. 2A, the secondary images may be collected and registered with one another to generate a stack of co-registered stains 243. The primary virtual thick slice 223 and the co-registered stack of stained slices 242 may be analyzed in a data-gathering or diagnosis step 251.

As described herein, a computational transformation of the Y_n images may be performed to reconstruct and spatially align the various sample slices to each other. The panel of stained Y_n images may be mapped back to the biomarker coordinates established by the X_n images by employing computational transformations. These remapped images will be referred to as Z_n. These computational transformations may include, but are not limited to:

a. "Procrustean" transformations, which may include stretch, shear, translation, rotation, and more general affine transformations to map visible variables or biomarkers across images.
b. "Elastic sheet" type transformations employing basis splines, or other non-linear interpolation schemes to map biomarkers by matching the curvature of the object, incorporating both affine and nonaffine transformations.
c. Optical-based corrections to account for the differences between the optics of the primary and secondary imaging. This can include include perspective, barrel, pincushion, and chromatic corrections.

Co-Registration

Another aspect of the disclosure describes a co-registration step, wherein the images from the PI and SI steps captured by the KESM are compared and aligned to each other based on the mapped biomarkers established in the reconstruction step.

Figure 2B:
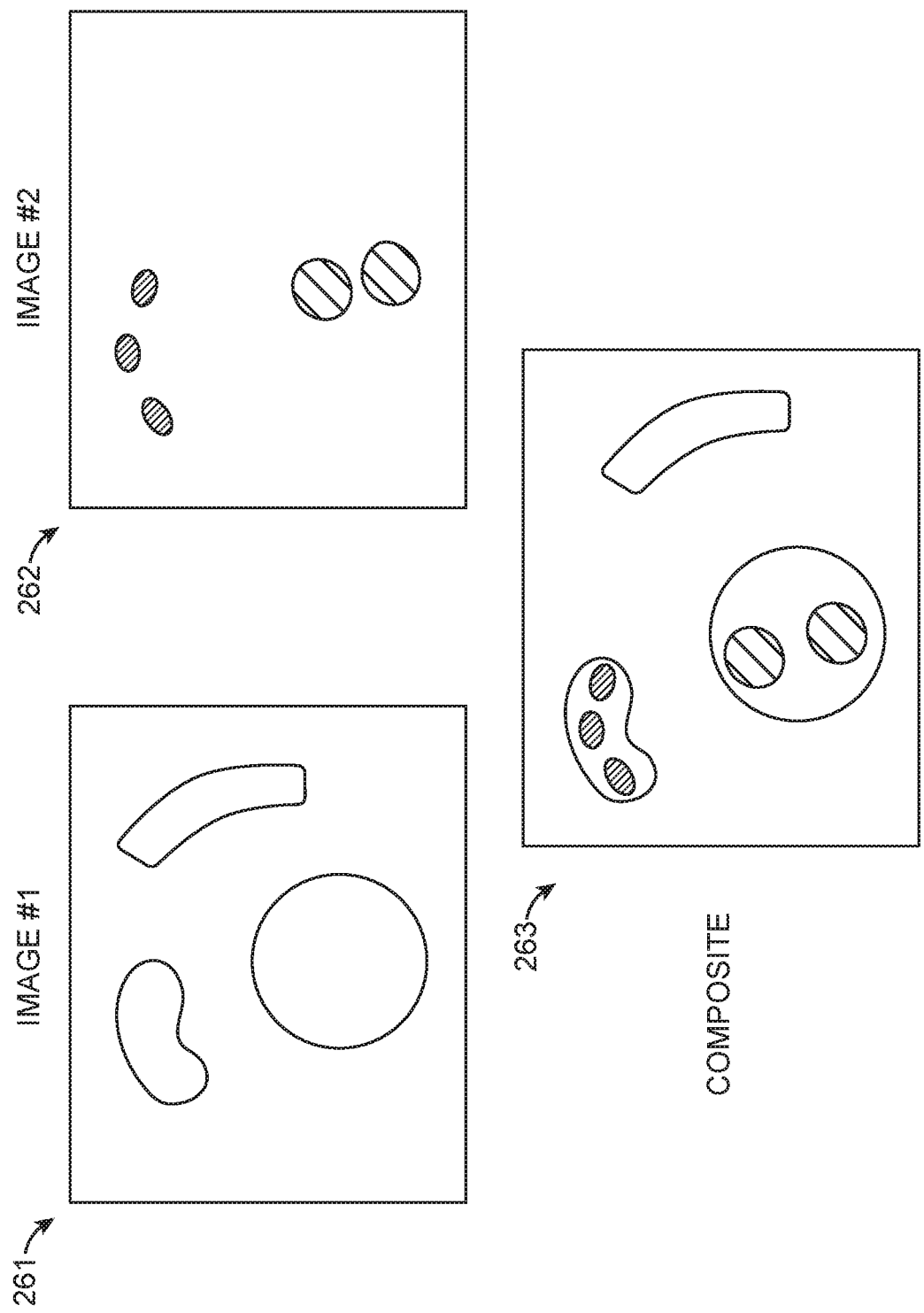
FIG. 2B is a schematic illustrating the co-registration of Primary and Secondary Images by side-by-side presentation.
Figure 2C:
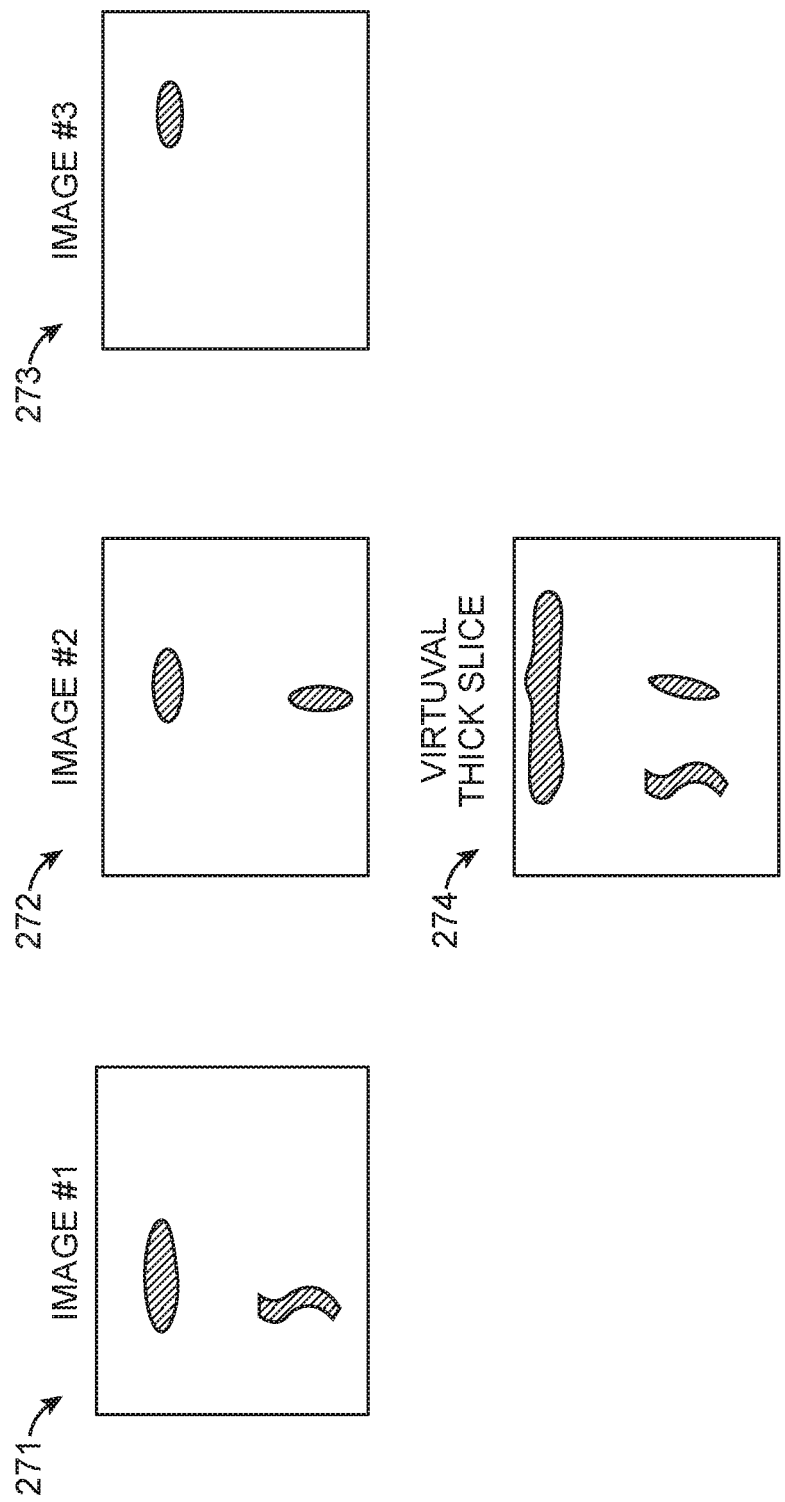
FIG. 2C is a schematic illustrating the co-registration of several Z images with different stains applied by mathematical combination to create a composite image of coincident stain reactions.

As described herein, the stack of $Z\_n$ images may be superimposed to co-register the different stains. This step may be repeated to complete a full panel of stains and compare the results based on the co-registered images. Methods for completing the co-registration step may include:
a. Side-by-side presentation, rendering, or image overlay of the $Z\_n$ images. FIG. 2B illustrates how the Primary images 261 and Secondary images 262 are co-registered using a side-by-side presentation method, and may be shown as a composite image 263.
b. Mathematical combination of several Z images to create a composite image or virtual "slice" capable of showing where different stains are present, and/or coincident. FIG. 2C illustrates how several images 271, 272, 273 may be combined to create a composite image 274 by mathematic combination.

Further Embodiments

An additional embodiment of a workflow may be similar to the work flow 200 above, with an additional imaging step between the mounting and staining steps.

The above description(s) describes the treatment of a single slice in FIG. 2A. Using the primary imaging information, multiple slices may be aligned across the Z plane to the slices above and below within the sample. Using this anchoring, the workflows 100A, 100B, 100C described above may be replaced in the following ways:

The Anatomist Workflow 100A: All of the stains in the "stain-panel" can be made the same. Each stained slice may be linked back to its primary imaging, and the primary images to each other. This can both improve the quality of reconstruction, as well as minimize the fraction of human involvement.

The Histologist/Pathologist Workflow 100B: A large number of requested stains could be run independently within the panel. Each of these stained images may be again linked back to the primary imaging, and many layers/contrast agents may be linked back to the overall sample. This may minimize the number of iterations in which the medical professional would be involved, and lead to a quicker diagnosis, and faster turnaround on lab analyses.

The Biologist Workflow 100C: Several different stains could be repeated on interleaved layers. In this way stains could be multiplexed over the sample volume, and example including 3 stains labeled a, b, c might look like:

a|b|c|a|b|c|a|b|c|a|b|c|a|b|c|a|b|c|

This multiplexing approach gives a larger 3D distribution of the labels across the volume while tethering each slice back to the overall block. Additionally, the stained information could be interpolated across adjacent sections.

These embodiments could also be augmented in any one of at least the following ways:
1. Several channel images can be combined into one, creating a virtual multi-channel panel image
2. The optimal sectioning thickness and number of stains can be determined by the features observed in the primary imaging, i.e. some features may be large, and thick sections may be appropriate, where other features are smaller and may necessitate thin sections.
3. The entire panel does not have to be determined at once. The output of a first round of imaging could be used to determine the second round.
4. Section thickness could be adjusted with respect to the stain chemistry, i.e. thinner or thicker sections can be cut for a multiplexed stain optimized for each particular contrast agent's properties.
5. Every n'th slice might be treated differently, based on the primary imaging. This might include:
6. Being sliced at a thickness optimal for the stain in question.
7. Being diverted to a molecular diagnostic or other chemical assay.
8. Be discarded based on an imaging or slicing defect or lack of sample in the slice.
9. Be archived to comply with regulations.
10. As above, but instead making the slice treatment decision based on the Primary Imaging step.

While preferred embodiments of the present disclosure have been shown and described herein, it will be obvious to those skilled in the art that such embodiments are provided by way of example only. Numerous variations, changes, and substitutions will now occur to those skilled in the art without departing from the scope of the present disclosure. It should be understood that various alternatives to the embodiments of the present disclosure described herein may be employed in practicing the inventions of the present disclosure. It is intended that the following claims define the scope of the invention and that methods and structures within the scope of these claims and their equivalents be covered thereby.

What is claimed is:

1. A method of analyzing a sample, the method comprising:
    slicing the sample into a plurality of sections;
    for each section of the plurality of sections:
        generating a primary image of the section as the section is being sliced;
        associating the primary image with the section;
        staining the section;
        generating a secondary image of the section by imaging the stained section;
        associating the secondary image with the section;
        co-registering the associated primary image with the associated secondary image by post-processing the associated primary image having no distortions with the associated secondary image having distortions that occurred during the staining, thereby improving post-processing of images; and wherein the post-processing includes processing distortions in the associated secondary image based on the associated primary image; and co-registering the secondary images associated with the plurality of sections with one another.

2. The method of claim 1, wherein the sample comprises a tissue sample.

3. The method of claim 1, further comprising generating a virtual model of the sample based on stored primary images associated with the plurality of sections.

4. The method of claim 3, further comprising co-registering the co-registered plurality of secondary images of the sample to the virtual model.

5. The method of claim 4, further comprising generating a diagnosis in response to the co-registration of the virtual model of the sample and the co-registered plurality of secondary images.

6. The method of claim 1, wherein the sample is sliced with a Knife Edge Scanning Microscope (KESM).

7. The method of claim 1, wherein slicing the sample into a plurality of sections comprises slicing a block face of the sample.

8. The method of claim 1, further comprising mounting the plurality of sections into a plurality of slides.

9. The method of claim 1, wherein the section is stained with an antigen or protein stain.

10. The method of claim 1, further comprising distorting the secondary images using one or more of a stretching, shearing, translational, rotational, spline, non-linear interpolation, or optical correction transformation.

11. The method of claim 1, further comprising generating a composite image of an individual primary image and an individual secondary image.

12. One or more non-transitory computer-readable storage media, storing one or more sequences of instructions, which when executed by one or more processors cause performance of: slicing the sample into a plurality of sections; for each section of the plurality of sections: generating a primary image of the section as the section is being sliced; associating the primary image with the section; staining the section; generating a secondary image of the section by imaging the stained section; associating the secondary image with the section; and co-registering the associated primary image with the associated secondary image by post-processing the associated primary image having no distortions with the associated secondary image having distortions that occurred during the staining, thereby improving post-processing of images; wherein the post-processing includes processing distortions in the associated secondary image based on the associated primary image; and co-registering the secondary images associated with the plurality of sections with one another.

13. The one or more non-transitory computer-readable storage media of claim 12, wherein the sample comprises a tissue sample.

14. The one or more non-transitory computer-readable storage media of claim 12, wherein the one or more sequences of instructions, which when executed by the one or more processors cause further performance of:
generating a virtual model of the sample based on stored primary images associated with the plurality of sections; and
co-registering the co-registered plurality of secondary images of the sample to the virtual model.

15. The one or more non-transitory computer-readable storage media of claim 12, wherein the one or more sequences of instructions, which when executed by the one or more processors cause further performance of:
generating a virtual model of the sample based on stored primary images associated with the plurality of sections;
co-registering the co-registered plurality of secondary images of the sample to the virtual model; and
generating a diagnosis in response to the co-registration of the virtual model of the sample and the co-registered plurality of secondary images.

16. The one or more non-transitory computer-readable storage media of claim 12, wherein the sample is sliced with a Knife Edge Scanning Microscope (KESM).

17. The one or more non-transitory computer-readable storage media of claim 12, wherein slicing the sample into a plurality of sections comprises slicing a block face of the sample.

18. The one or more non-transitory computer-readable storage media of claim 12, wherein the section is stained with an antigen or protein stain.

* * * * *